(12) United States Patent
Manabe

(10) Patent No.: US 10,728,448 B2
(45) Date of Patent: Jul. 28, 2020

(54) IMAGE PROCESSING APPARATUS, IMAGE PROCESSING METHOD AND STORAGE MEDIUM TO OBTAIN A COLOR DIFFERENCE OF AN OBJECT

(71) Applicant: CANON KABUSHIKI KAISHA, Tokyo (JP)

(72) Inventor: Yoshihiro Manabe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/396,136

(22) Filed: Apr. 26, 2019

(65) Prior Publication Data

US 2019/0349521 A1  Nov. 14, 2019

(30) Foreign Application Priority Data

May 10, 2018 (JP) .................................. 2018-091570

(51) Int. Cl.
*H04N 5/232* (2006.01)
*H04N 5/262* (2006.01)
*G06K 9/32* (2006.01)
*H04N 9/04* (2006.01)
*H04N 5/30* (2006.01)

(52) U.S. Cl.
CPC ....... *H04N 5/23229* (2013.01); *G06K 9/3241* (2013.01); *H04N 5/2628* (2013.01); *H04N 9/045* (2013.01); *H04N 5/30* (2013.01)

(58) Field of Classification Search
CPC .... H04N 5/232; H04N 5/23229; H04N 5/262; H04N 5/2628; H04N 9/045; H04N 5/30; G06K 9/3241
See application file for complete search history.

(56) References Cited

U.S. PATENT DOCUMENTS

| 9,906,740 | B2 |  | 2/2018 | Manabe |
| 10,198,872 | B2 | * | 2/2019 | Lurie ....................... G06T 19/20 |
| 10,417,751 | B2 | * | 9/2019 | Hattori ............... G06K 9/00798 |
| 2019/0279388 | A1 | * | 9/2019 | Kato .................. G01N 21/9515 |

FOREIGN PATENT DOCUMENTS

JP        2000205846 A     7/2000

* cited by examiner

*Primary Examiner* — Ngoc Yen T Vu
(74) *Attorney, Agent, or Firm* — Carter, DeLuca & Farrell LLP

(57) ABSTRACT

The image processing apparatus includes: an angle derivation unit configured to derive an image capturing angle for the image capturing unit in a local area on a surface in the object based on image capturing orientation information relating to an orientation at the time of image capturing of an image capturing unit and object information relating to a shape of an object captured by the image capturing unit; and a color difference derivation unit configured to derive a color difference from an arbitrary reference value in the object based on image data representing an image obtained by the image capturing unit capturing the object, and the color difference derivation unit derives a color difference variation width in at least one predetermined angle range of an image capturing angle for the image capturing unit in a local area on a surface in the object.

20 Claims, 17 Drawing Sheets

| MEMBER | PAINT | REFERENCE COLOR DIFFERENCE CORRESPONDING TO WITHIN-IDENTICAL ANGLE | REFERENCE COLOR DIFFERENCE CORRESPONDING TO CHANGE IN ANGLE |
|---|---|---|---|
| MEMBER A | PAINT 1 | $\Delta E = 2.0$ | $\Delta E = 5.0$ |
| MEMBER A | PAINT 2 | $\Delta E = 2.5$ | $\Delta E = 8.0$ |
| ... | ... | ... | ... |
| MEMBER B | PAINT 1 | $\Delta E = 1.5$ | $\Delta E = 5.0$ |
| MEMBER B | PAINT 2 | $\Delta E = 3.0$ | $\Delta E = 10.0$ |

FIG.16

IMAGE PROCESSING APPARATUS, IMAGE PROCESSING METHOD AND STORAGE MEDIUM TO OBTAIN A COLOR DIFFERENCE OF AN OBJECT

BACKGROUND OF THE INVENTION

Field of the Invention

The present invention relates to a technique to convert the color of color image data.

Description of the Related Art

In recent years, various techniques have been developed, which inspect an object by using a digital image capturing apparatus, such as a digital still camera and a digital video camera. For example, Japanese Patent Laid-Open No. 2000-205846 has disclosed a technique to derive luminance by analyzing image data of an object obtained by a camera and to inspect coating unevenness by using the luminance.

SUMMARY OF THE INVENTION

Note that, there is a case where the luminance changes resulting from the shape of a curved surface or the like, such as a concave surface and a convex surface, which exists on the object to be inspected, not only resulting from coating unevenness. With the technique of Japanese Patent Laid-Open No. 2000-205846 described above, there is a case where a change in luminance resulting from the shape of a curved surface or the like, such as a concave surface and a convex surface, is determined to be a change due to coating unevenness. Because of this, the inspection accuracy is reduced.

From the above, the present invention provides a technique to provide information for a user to identify a change in color due to angle and color unevenness.

The image processing apparatus of one aspect of the present invention includes: a first acquisition unit configured to acquire image capturing orientation information relating to an orientation at the time of image capturing of an image capturing unit; a second acquisition unit configured to acquire object information relating to a shape of an object captured by the image capturing unit; an angle derivation unit configured to derive an image capturing angle for the image capturing unit in a local area on a surface in the object based on the image capturing orientation information and the object information; and a color difference derivation unit configured to derive a color difference from an arbitrary reference value in the object based on image data representing an image obtained by the image capturing unit capturing the object, and the color difference derivation unit derives a color difference variation width in at least one predetermined angle range of an image capturing angle for the image capturing unit in a local area on a surface in the object.

Further features of the present invention will become apparent from the following description of exemplary embodiments with reference to the attached drawings.

BRIEF DESCRIPTION OF THE DRAWINGS

FIG. 16 is a diagram showing an example of reference color difference data; and

DESCRIPTION OF THE EMBODIMENTS

In the following, aspects for embodying the present invention are explained by using the drawings. The following embodiments do not necessarily limit the invention according to the claims and all combinations of features explained in the embodiments are not necessarily indispensable to the solution of the invention.

First Embodiment

Figure 1:
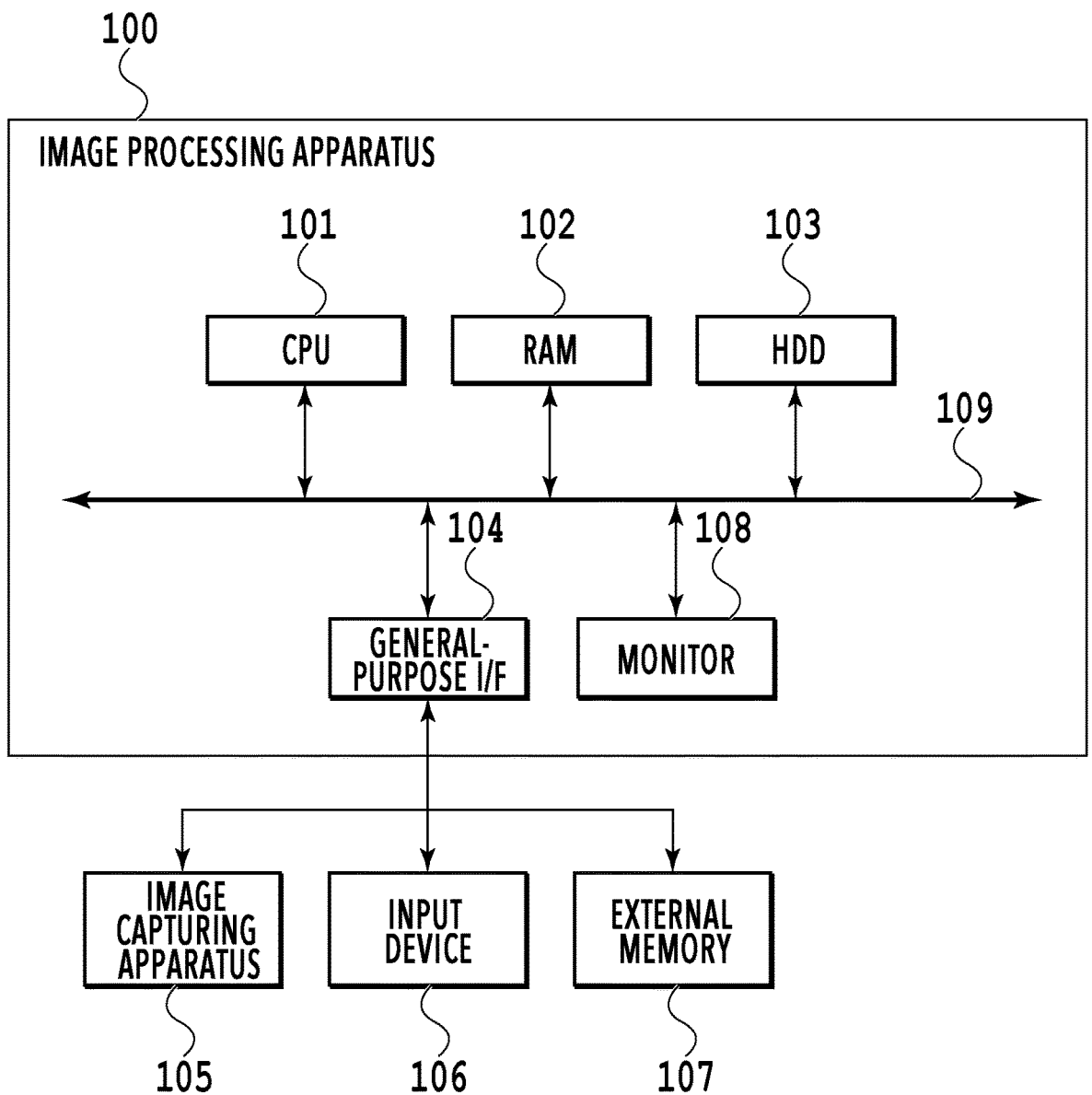
FIG. 1 is a diagram showing an example of a hardware configuration of an image processing apparatus.

An outline configuration of an image processing apparatus according to the present embodiment is explained by using FIG. 1. FIG. 1 is a block diagram showing an example of a hardware configuration of an image processing apparatus of the present embodiment. As shown in FIG. 1, an image processing apparatus 100 of the present embodiment includes a CPU 101, a RAM 102, an HDD 103, a general-purpose interface (hereinafter, interface is described as "I/F") 104, and a monitor 108. Those units are connected to one another so as to be capable of transmission and reception of data by a main bus 109. The general-purpose I/F 104 connects an image capturing apparatus 105, such as a camera, an input device 106, such as a mouse and a keyboard, and an external memory 107, such as a memory card, a CF card, an SD card, and a USB memory, to the main bus 109.

In the following, various kinds of processing implemented by the CPU 101 causing various kinds of software (computer programs) stored in the HDD 103 to run are described.

First, the CPU 101 boots an image processing application stored in the HDD 103 and displays a user interface (UI) on the monitor 108 as well as loading the image processing application onto the RAM 102. Following the above, various kinds of data stored in the HDD 103 and the external memory 107, object information on an object relating to the shape, the position at the time of image capturing and the like, image data captured by the image capturing apparatus 105, instructions from the input device 106 and the like are transferred to the RAM 102. It is assumed that the image capturing apparatus 105 is provided with a sensor for acquiring external parameters of the image capturing apparatus 105, that is, image capturing orientation information on the image capturing position, the image capturing orientation and the like of the image capturing apparatus 105. As the sensor, mention is made of, for example, a GPS sensor (position sensor), a geomagnetic sensor (azimuth sensor) and the like. Further, in accordance with the processing within the image processing application, various arithmetic operations are performed for the image data stored in the RAM 102 based on instructions from the CPU 101. Arithmetic operation results are displayed on the monitor 108, stored in the HDD 103 or the external memory 107 and the like.

Details of the processing to analyze image data by the image processing application and display color difference information based on instructions from the CPU 101 in the image processing apparatus 100 with the configuration described above are explained.

(Function Configuration of Image Processing Apparatus)

Figure 2:
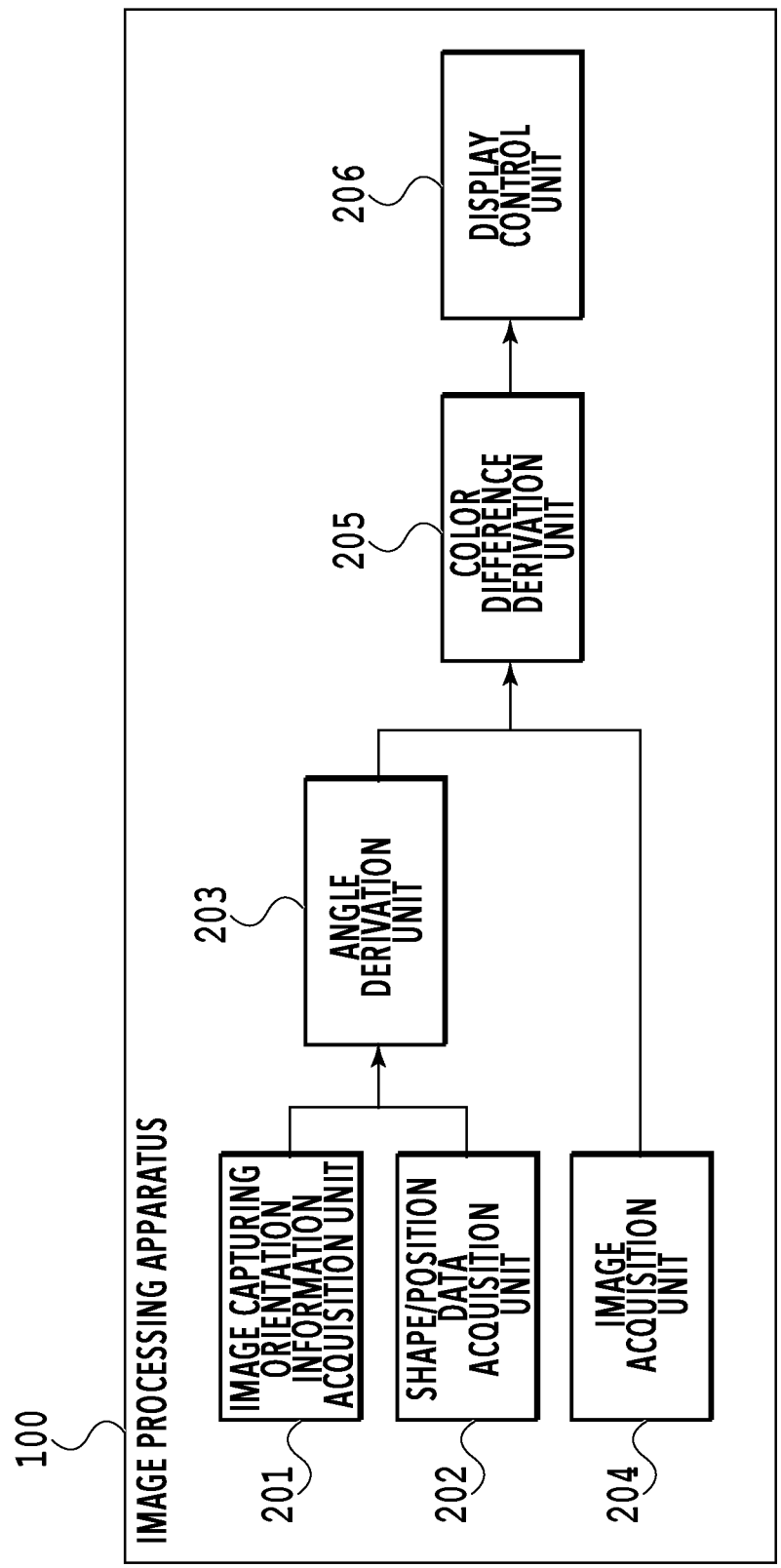
FIG. 2 is a function block diagram showing a software configuration of the image processing apparatus.

Next, the function configuration of the image processing apparatus of the present embodiment is explained with reference to FIG. 2. FIG. 2 is a function block diagram showing a software configuration of the image processing apparatus 100. The image processing apparatus 100 of the present embodiment has an image capturing orientation information acquisition unit (first acquisition unit) 201, a shape/position data acquisition unit (second acquisition unit) 202, an angle derivation unit (light receiving angle derivation unit) 203, an image acquisition unit 204, a color difference derivation unit 205, and a display control unit 206. The function of each unit shown in FIG. 2 is implemented by the CPU 11 reading a program stored within the HDD 103 and executing the program. It may also be possible to configure an image processing apparatus including a dedicated processing circuit corresponding to each unit.

The image capturing orientation information acquisition unit 201 acquires image capturing orientation information on the image capturing apparatus 105 based on instructions from the CPU 101. The image capturing orientation information includes image capturing position information indicating the image capturing position of the image capturing apparatus 105 and image capturing orientation information indicating the image capturing direction at the time of image capturing of the image capturing apparatus 105.

The shape/position data acquisition unit 202 acquires object information relating to the shape of an object, which is an image capturing target, the position thereof and the like. In the present embodiment, the data acquired as the object information is called shape/position data. The shape/position data includes, for example, vertex coordinates (x, y, z) of a polygon (normally, triangle) and has polygon data described by a set of surfaces determined based on combinations of the vertexes. The polygon data is associated with normal information derived by a publicly known technique and the shape/position data is stored in advance in the HDD 103, the external memory 107 and the like.

The angle derivation unit 203 derives a light receiving angle at each point of an object based on the image capturing orientation information acquired by the image capturing orientation information acquisition unit 201 and the shape/position data acquired by the shape/position data acquisition unit 202 based on the instructions from the CPU 101. The light receiving angle is an angle formed by the direction in which the sensor surface of the image capturing apparatus receives the light reflecting from the object and the normal of the object at the point from which the light reflects and details will be described later. That is, the angle derivation unit 203 derives the light receiving angle at each polygon surface of the polygon data based on the image capturing orientation information on the image capturing apparatus 105 and the shape data of the object. The derived light receiving angle is stored in the RAM 102, the HDD 103 and the like.

The image acquisition unit 204 acquires image data representing an image obtained by the image capturing apparatus 105 capturing the object based on the instructions from the CPU 101. The image data is data having two-dimensional color information. The color information may be in any format, for example, such as RGB, XYZ, and Lab value. In the present embodiment, it is assumed that the color information is device-independent tri-stimulus values XYZ. Further, the image acquisition unit 204 performs color conversion for the two-dimensional color information of the image data based on the instructions from the CPU 101. That is, the image acquisition unit 204 has a function to acquire image data, a function to acquire color information from image data, and a function to convert color information.

The color difference derivation unit 205 derives color difference information on the object based on the two-dimensional color information included in the image data acquired by the image acquisition unit 204 and the angle (light receiving angle) derived by the angle derivation unit 203 based on the instructions from the CPU 101.

The display control unit 206 displays the color difference information derived by the color difference derivation unit 205 on the monitor 108 based on the instructions from the CPU 101. Details of the display processing by the display control unit 206 will be described later.

(Main Processing Flow of First Embodiment)

Figure 3:
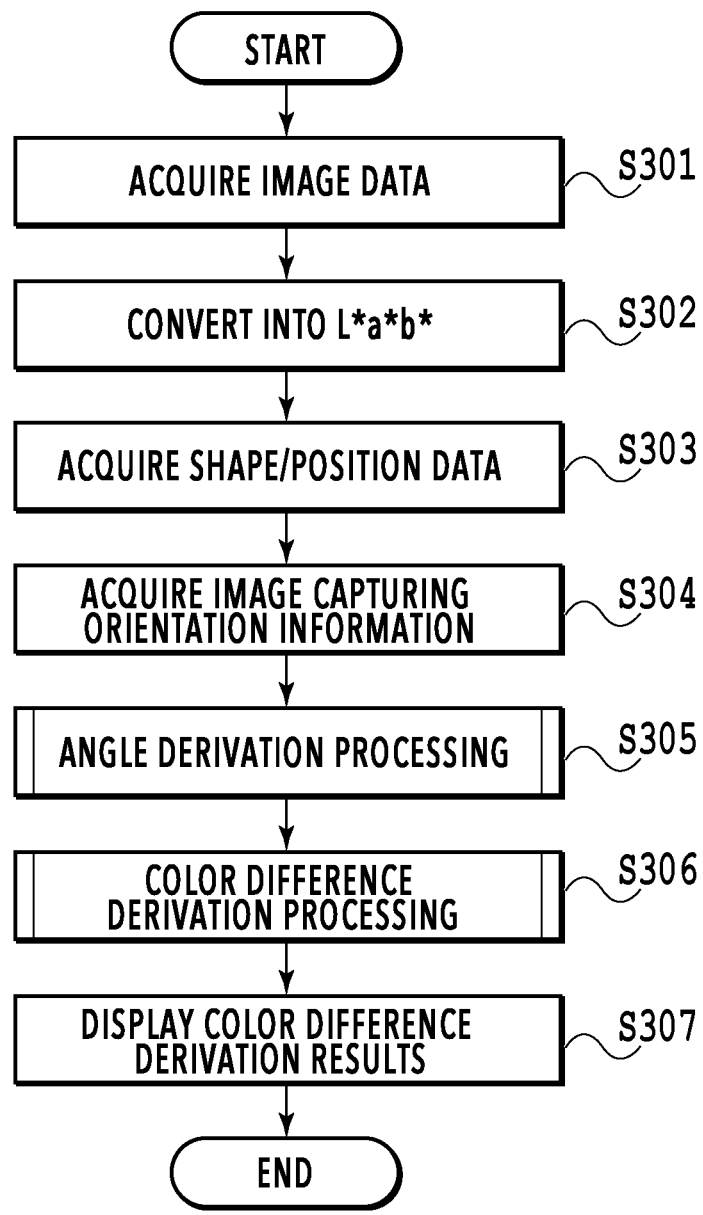
FIG. 3 is a flowchart showing a color difference information display processing procedure example.

In the following, details of processing to derive a color difference of an object based on color information of image data, object information (shape/position data), and image capturing orientation information and to display derivation results in the software configuration of the image processing apparatus explained in FIG. 2 are explained with reference to FIG. 3. FIG. 3 is a flowchart showing a procedure example of the color difference derivation result display processing by the image processing apparatus 100. Each symbol S in the following means that the step is a step in the flowchart.

At S301, the image acquisition unit 204 acquires image data obtained by capturing an object. The image data is image data having device-independent tri-stimulus values XYZ obtained by capturing each pixel by the image capturing apparatus 105.

At S302, the image acquisition unit 204 converts the XYZ values of the image data acquired at S301 into L*a*b* by using the color conversion formula specified by the CIE.

At S303, the shape/position data acquisition unit 202 acquires the shape/position data of the object stored in the HDD 103 or the external memory 107. The shape/position data is data including polygon data having a plurality of polygon surfaces with which the normal information on each surface is associated and position information on the object at the time of image capturing by the image capturing apparatus 105.

At S304, the image capturing orientation information acquisition unit 201 acquires the image capturing orientation information including information indicating the image capturing position of the image capturing apparatus 105 at the time of capturing the object (object) and information indicating the image capturing orientation thereof. In the present embodiment, it is assumed that the image capturing orientation information acquisition unit 201 acquires information indicating the image capturing position of the camera and information indicating the direction (image capturing orientation) thereof, detected by the GPS sensor and the geomagnetic sensor, respectively, mounted on the image capturing apparatus 105.

At S305, the angle derivation unit 203 derives the light receiving angle (angle) for each position of the object. Details of the derivation method of a light receiving angle will be described later.

At S306, the color difference derivation unit 205 derives color difference information in accordance with the light receiving angle based on the color information obtained at S302 and the information on the light receiving angle derived at S305. Details of the derivation method of color difference information in accordance with a light receiving angle will be described later.

At S307, the display control unit 206 displays the results of the color difference information derived at S306 on the monitor 108.

(Details of S305)

In the following, details of the derivation method of a light receiving angle (angle) for each position at S305 are explained by using the flow in FIG. 4 and the schematic diagram in FIG. 5

Figure 4:
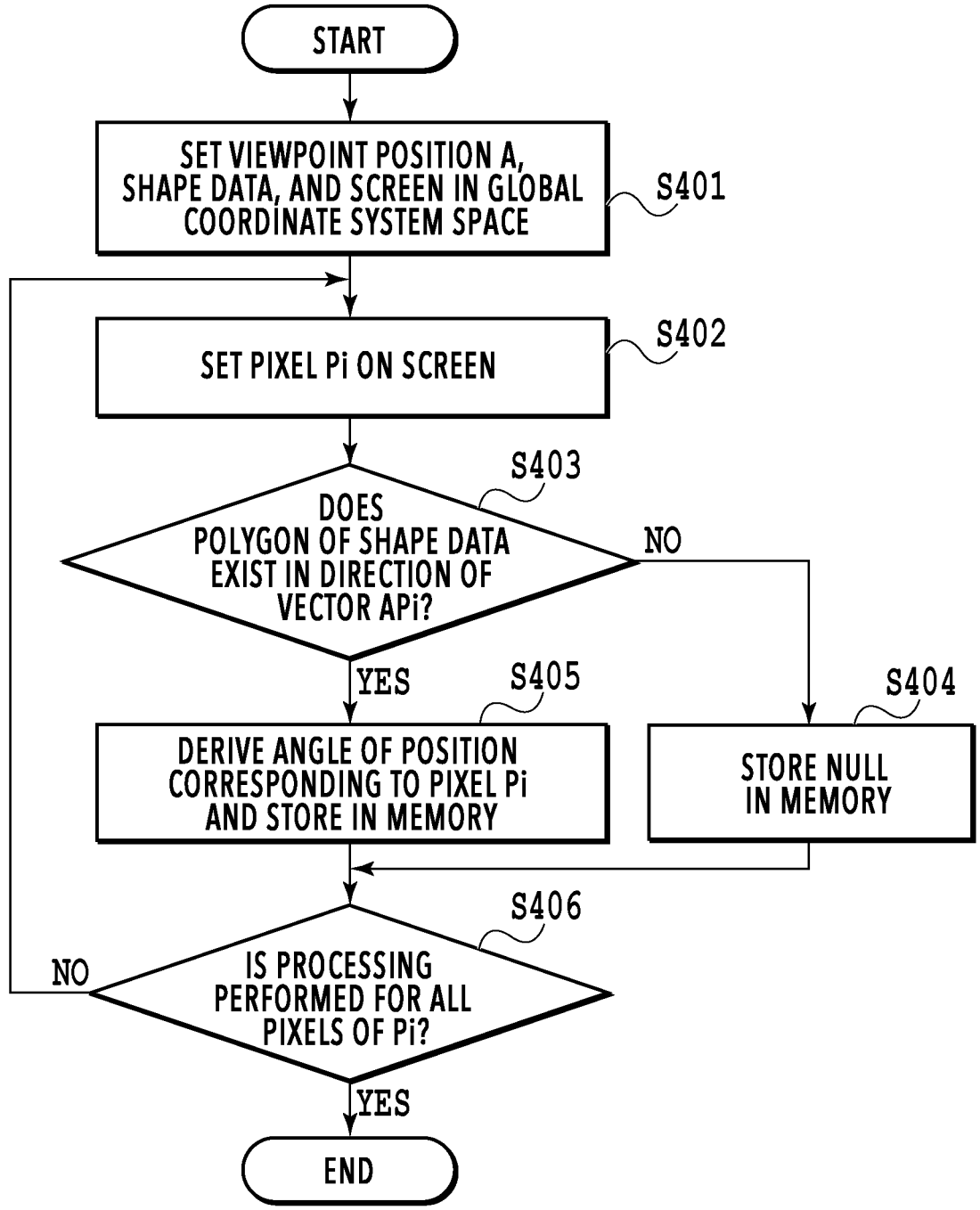
FIG. 4 is a flowchart showing an angle information derivation processing procedure example.
Figure 5:
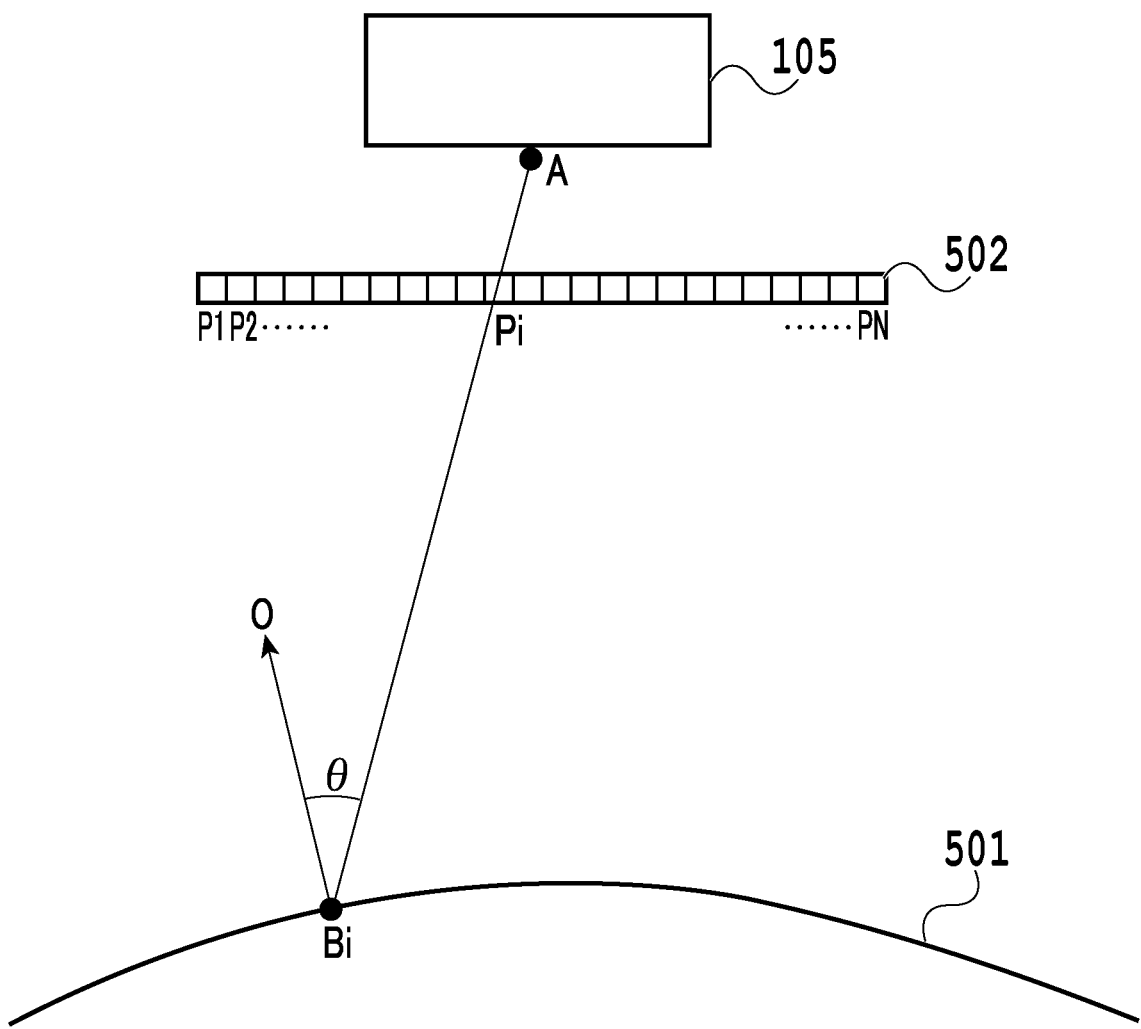
FIG. 5 is an explanatory diagram of angle information derivation processing.

First, the angle that is derived by the flow in FIG. 4 is explained by using the schematic diagram in FIG. 5. FIG. 5 is the schematic diagram for explaining angle information derivation processing and is the schematic diagram representing the position relationship between the object and the image capturing apparatus two-dimensionally. In FIG. 5, symbol A indicates the viewpoint position of the image capturing apparatus 105 and symbol Bi indicates the center position of a certain polygon surface in an object 501. Here, symbol 502 indicates a virtual screen in the world coordinate system set in accordance with the focus length and the resolution of the image capturing apparatus 105. It is possible to call the screen 502 by another term a projection surface of an object for the image capturing element of the image capturing apparatus 105. Symbol Pi on the screen 502 indicates the pixel of an image capturing element. The subscript i of symbol Pi is an integer N larger than or equal to 1 and indicates the pixel position. The number N of pixels is set in accordance with the resolution of the image capturing apparatus 105. Further, the subscript i of symbol Bi is set in accordance with the pixel Pi on the screen 502, at which a segment connecting the viewpoint position A of the image capturing apparatus 105 and the center position of a certain polygon surface intersects with the screen 502. Although the image capturing apparatus 105 and the object 501 are shown in the state where both are close to each other in FIG. 5, it is assumed that they are in fact in the state of being a sufficient distance apart from each other. Further, in the present embodiment, it is assumed that the object is illuminated uniformly from a position a sufficient distance apart from the object. In the present embodiment, although a case is explained where the center position B of a certain polygon surface is used, the position is not limited to the center position of a polygon surface. Note that, it is desirable to use a position in common to each polygon surface.

Here, the angle derivation method is explained by using the flowchart in FIG. 4. FIG. 4 is a flowchart showing an angle information derivation processing procedure example.

First, at S401, the angle derivation unit 203 sets the screen 502 for the viewpoint position A based on the image capturing orientation information (information on the position and orientation of the image capturing apparatus 105) acquired at S304. That is, the angle derivation unit 203 sets the viewpoint position A of the image capturing apparatus 105, shape data corresponding to the object 501, and the screen 502 in a virtual global coordinate system space.

Next, at S402, the angle derivation unit 203 sets the pixel Pi on the screen 502. It is assumed that the subscript i of the pixel Pi is an integer from 1 to N and set in accordance with the resolution or the like of the image capturing apparatus.

At S403, the angle derivation unit 203 determines whether or not a polygon surface (polygon mesh) corresponding to the object 501 exists in a vector direction from the viewpoint position A of the image capturing apparatus 105 toward the pixel Pi. For the determination, equation 1 below, which is a general equation of intersection determination of a ray (line of sight) and a polygon surface, used generally in the CG field is used.

[Equation 1]

$$t = -\frac{(A - Bi) \cdot BiO}{APi \cdot BiO} \quad (1)$$

Here, A is the viewpoint position of the image capturing apparatus 105, Pi is the position of the pixel of the screen 502, Bi is the center position of the polygon surface, corresponding to the pixel Pi, and O is a position in the direction of the normal for the center position Bi of the polygon surface. Further, APi is a vector indicating the line of sight of the image capturing apparatus 105 and BiO is a normal vector of the center position on the polygon surface. Furthermore, t is a parameter indicating a relationship between the ray and the polygon surface.

Figure 6:
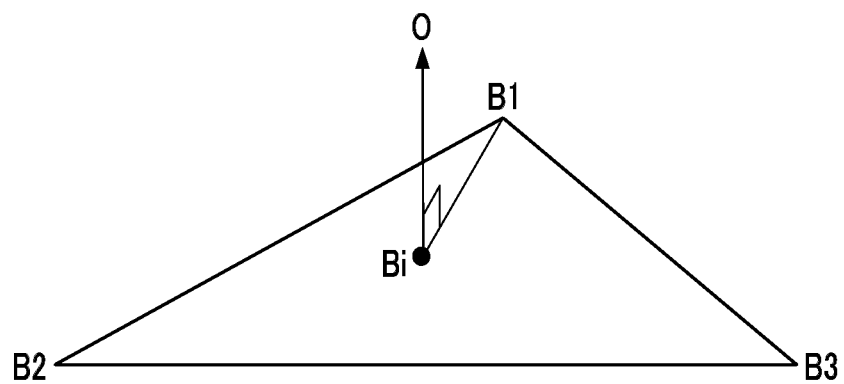
FIG. 6 is a schematic diagram showing a relationship between a polygon surface and a normal.

The position relationship of each point in equation 1 described above is explained by using FIG. 6. FIG. 6 is a diagram for explaining the center position of a certain polygon surface and the normal direction. Symbols B1, B2, and B3 indicate each vertex in a case where a certain polygon surface (polygon mesh) is triangular. Symbol Bi indicates the center position in the polygon surface having the three vertexes B1, B2, and B3. Symbol O indicates the normal direction for the center position Bi in the polygon surface. The angle derivation unit 203 derives t by using equation 1. Then, in a case where t is 0 or positive, the vector APi and the vector BiO coincide with each other, or are in a position relationship in which both vectors intersect with each other, and therefore, the angle derivation unit 203 determines that a polygon surface corresponding to a certain local area of the object 501 exists in the direction of the vector APi. In a case where the angle derivation unit 203 determines that a polygon surface exists, the processing advances to S405. On the other hand, in a case where t is negative, the positions of the vector APi and the vector BiO are in a skewed position relationship, and therefore, the angle derivation unit 203 determines that a polygon surface corresponding to a certain local area of the object 501 does not exist in the direction of the vector APi. In a case where the angle derivation unit 203 determines that a polygon surface does not exist, the processing advances to S404.

At S404, the angle derivation unit 203 determines that a polygon surface does not exist at S403 regarding the pixel Pi set at S402, and therefore, no object exists in the direction of the vector APi and NULL is stored in the memory (RAM 102). After NULL is stored in the memory, the processing advances to S406.

At S405, the angle derivation unit 203 derives the angle (light receiving angle) formed by the vector APi and the vector BiO regarding the pixel Pi set at S402 and stores the derived angle in the memory (RAM 102). Here, in a case where AP=(a1, a2, a3) and BO=(b1, b2, b3) are assumed, an angle θ formed by both vectors is represented by equation 2 below.

[Equation 2]

$$\theta = \arccos\left(\frac{a1b1 + a2b2 + a3b3}{\sqrt{a1^2 + a2^2 + a3^2}\sqrt{b1^2 + b2^2 + b3^2}}\right) \quad (2)$$

This angle θ represents the image capturing angle for the polygon surface of a certain local area on the surface of the object.

Figure 7:
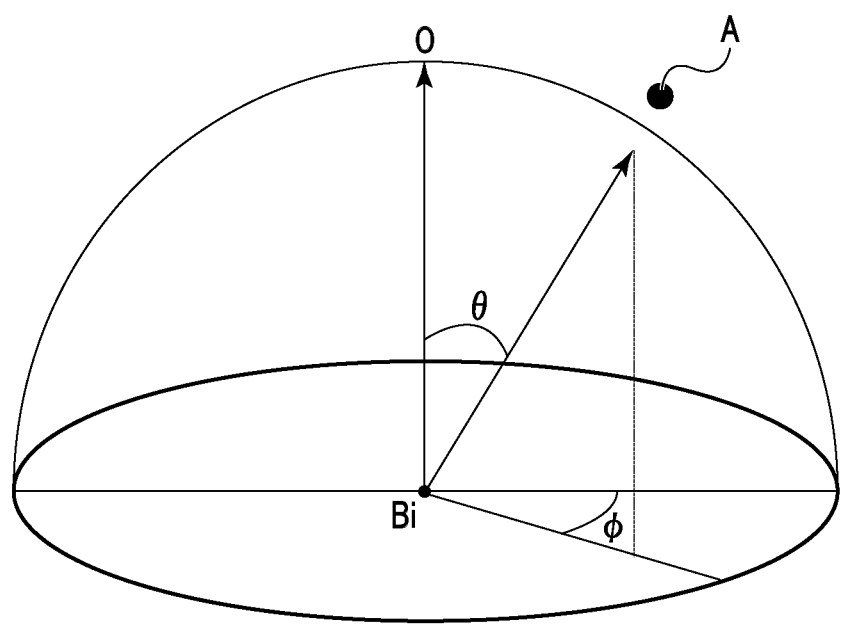
FIG. 7 is a schematic diagram explaining an elevation angle θ and an azimuth angle φ for an object at the time of image capturing.

Further, in FIG. 5, the position relationship is shown two-dimensionally and only the angle θ in the elevation angle direction is shown schematically. Note that, as shown in FIG. 7, an angle φ in the azimuth angle direction is also an angle that affects the light reflection distribution. Consequently, by deriving the azimuth angle φ in addition to the angle θ in the elevation angle direction, regarding the color difference for the angle, it is possible to drive in more detail the average color difference for each angle and the color difference variation width within the angle range. In a case where it is assumed that AP=(a1, a2, a3) and BO=(b1, b2, b3) as in equation 2 described above, the angle φ in the azimuth angle direction is represented by equation 3 below.

[Equation 3]

$$\phi = \arctan\left(\frac{\sqrt{(a2 - b2)^2}}{\sqrt{(a1 - b1)^2}}\right) \quad (3)$$

In the present embodiment, the derivation of the angle in the azimuth angle direction is not performed and it is assumed that an average color difference $\Delta E_{max\ min,\ \theta}$ for each angle and a color difference variation width $\Delta E_{all,\ \theta}$ within the angle range (within the image capturing angle) are derived, respectively, regarding the color difference for the angle in the elevation angle direction.

Next, at S406, the angle derivation unit 203 sets all the pixels as the pixel Pi and determines whether or not the angle derivation processing is performed. In a case where there is an unprocessed pixel, the processing returns to S402 and the angle derivation unit 203 sets another pixel other than the pixel for which the angle derivation processing has been performed as the pixel Pi. Then, the angle derivation unit 203 performs the determination of whether or not a polygon surface exists in the direction of the vector APi and stores the determination results in the memory as previously at S403 to S405 for the pixel Pi set anew at S402. Then, in a case where the angle derivation unit 203 determines that the angle determination processing is performed for all the pixels, this processing is terminated.

(Details of S306)

Figure 8:
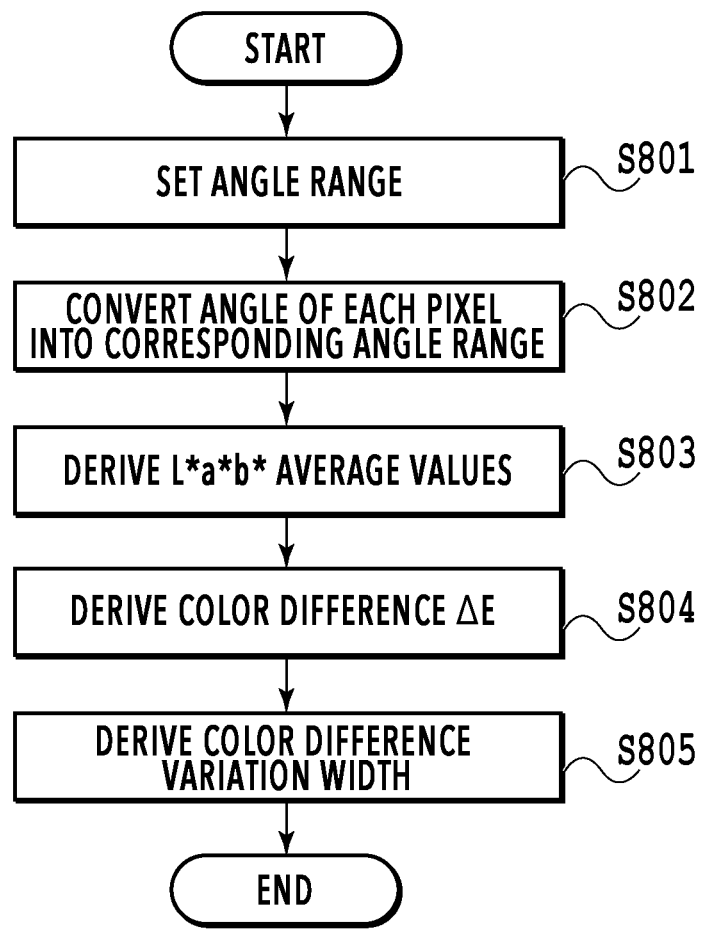
FIG. 8 is a flowchart showing a color difference information derivation processing procedure example.

In the following, details of the color difference information derivation method for each light receiving angle at S306 are explained by using the flow in FIG. 8. FIG. 8 is a flowchart showing a color difference information derivation processing procedure example.

First, at S801, an angle range is set, for which an angle calculation is performed in accordance with instructions of a user for the input device 106. For example, in a case where an angle range is set from −45 degree to +45 degrees at five-degree intervals, a total of 18 angle ranges are set. The angle interval is not limited to five degrees and it is possible to arbitrarily set in accordance with instructions of a user. Further, it is assumed that the lower limit value of each angle range is larger than or equal to the angle and the upper limit value is less than the angle.

Next, at S802, the color difference derivation unit 205 sets the angle of each pixel derived at S305 to the corresponding angle range. In the present embodiment, which of a plurality of angle ranges the angle derived at S305 corresponds to is determined and the corresponding angle range is set in accordance with results of the determination. For example, in a case where the angle derived at S305 is 23 degrees, the color difference derivation unit 205 determines that 23 degrees corresponds to the angle range not less than 20 degrees and less than 25 degrees and sets 23 degrees to the angle range not less than 20 degrees and less than 25 degrees.

Next, at S803, the color difference derivation unit 205 derives average values $L^*_{ave,\ \theta}$, $a^*_{ave,\ \theta}$, and $b^*_{ave,\ \theta}$ of $L^*a^*b^*$ for each angle range set at S802. For the derivation of each average value, each of equation 4, equation 5, and equation 6 below is used.

[Equation 4]

$$L^*_{ave,\theta} = \sum_{i,j=1}^{N} \frac{L^*_{i,j}}{N} \quad (4)$$

[Equation 5]

$$a^*_{ave,\theta} = \sum_{i,j=1}^{N} \frac{a^*_{i,j}}{N} \quad (5)$$

[Equation 6]

$$b^*_{ave,\theta} = \sum_{i,j=1}^{N} \frac{b^*_{i,j}}{N} \quad (6)$$

In equation 4 to equation 6, the subscript "θ" of $L^*$, $a^*$, and $b^*$ indicates the angle in the elevation angle direction described above. N in equation 4 is a quantity of $L^*$ within the angle range, N in equation 5 is a quantity of $a^*$ within the angle range, and N in equation 6 is a quantity of $b^*$ within the angle range. Further, the subscripts "i" and "j" of $L^*$, $a^*$, and $b^*$ indicate a pixel on the screen and "i" indicates the pixel position in the horizontal direction of the screen 502 in FIG. 5 and "j" indicates the pixel position in the direction perpendicular to that of "i" of the screen 502 in FIG. 5.

Next, at S804, the color difference derivation unit 205 derives a color difference $\Delta E_{i,\ j,\ \theta}$ from $L_{i,\ j,\ \theta}$, $a_{i,\ j,\ \theta}$, and $b_{i,\ j,\ \theta}$ of all the pixels and a color difference $\Delta E_{ave,\ \theta}$ from $L^*_{ave, \theta}$ $a^*_{ave, \theta}$ $b^*_{ave, \theta}$ derived at S803 for a Lab value $L^*_0 a^*_0 b^*_0$, which is an arbitrary reference. $L^*_0 a^*_0 b^*_0$ is a numerical value that is set in accordance with color information on an object. For the derivation of the color difference $\Delta E_{i, j, \theta}$, equation 7 below is used and for the derivation of the color difference $\Delta E_{ave, \theta}$, equation 8 below is used.

[Equation 7]

$$\Delta E_{i,j,\theta} = \sqrt{(L^*_{i,j,\theta} - L^*_0)^2 + (a^*_{i,j,\theta} - a^*_0)^2 + (b^*_{i,j,\theta} - b^*_0)^2} \quad (7)$$

In equation 7, the subscripts "i" and "j" of $\Delta E$, $L^*$, $a^*$, and $b^*$ indicate the pixel on the screen, respectively, as in equation 4 to equation 6 described above.

[Equation 8]

$$\Delta E_{ave,\theta} = \sqrt{(L^*_{ave,\theta} - L^*_0)^2 + (a^*_{ave,\theta} - a^*_0)^2 + (b^*_{ave,\theta} - b^*_0)^2} \quad (8)$$

Next, at S805, the color difference derivation unit 205 derives a within-identical angle color difference (hereinafter, also referred to as average color difference for each angle), which is a variation amount in the color difference between the maximum value and the minimum value for each θ in a predetermined angle range for the color difference $\Delta E_{i, j, \theta}$ derived by equation 7 at S804. For the derivation of the average color difference for each angle, equation 9 below is used.

[Equation 9]

$$\Delta E_{max\ min,\theta} = \max(\Delta E_{i,j,\theta}) - \min(\Delta E_{i,j,\theta}) \quad (9)$$

Further, the color difference derivation unit 205 derives a color difference due to a change in angle (hereinafter, also referred to as color difference variation width within the angle range), which is the variation amount of the color difference due to a change in the angle range for the color difference $\Delta E_{ave, \theta}$ derived by equation 8 at S804. For the derivation of the color difference variation width, equation 10 below is used.

[Equation 10]

$$\Delta E_{all,\theta} = \max(\Delta E_{ave,\theta}) - \min(\Delta E_{ave,\theta}) \quad (10)$$

Here, $\Delta E_{max\ min, \theta}$, which is the derivation results by equation 9, takes only the color difference within a predetermined angle range not affected by a change in color due to angle as an arithmetic operation target and is a numerical value derived by regarding the angle within a predetermined angle range being the identical angle. Because of this, it is made possible for a user to identify the derived $\Delta E_{max\ min, \theta}$ as information on color unevenness that is not affected by a change in angle of the paint, that is, not affected by a change in color due to angle. $\Delta E_{all, \theta}$, which is the derivation results by equation 10, is a numerical value derived by taking the color difference within the angle range as an arithmetic operation target. Because of this, it is made possible for a user to identify the derived $\Delta E_{all, \theta}$ as information on a change in color due to angle of the paint. In the present embodiment, the color difference is derived for the elevation angle θ and in a case where the azimuth angle φ is also measured, it is also possible to derive a color difference by combining the elevation angle θ and the azimuth angle φ.

(UI Example Provided by Display Control Unit 206)

Figure 9:
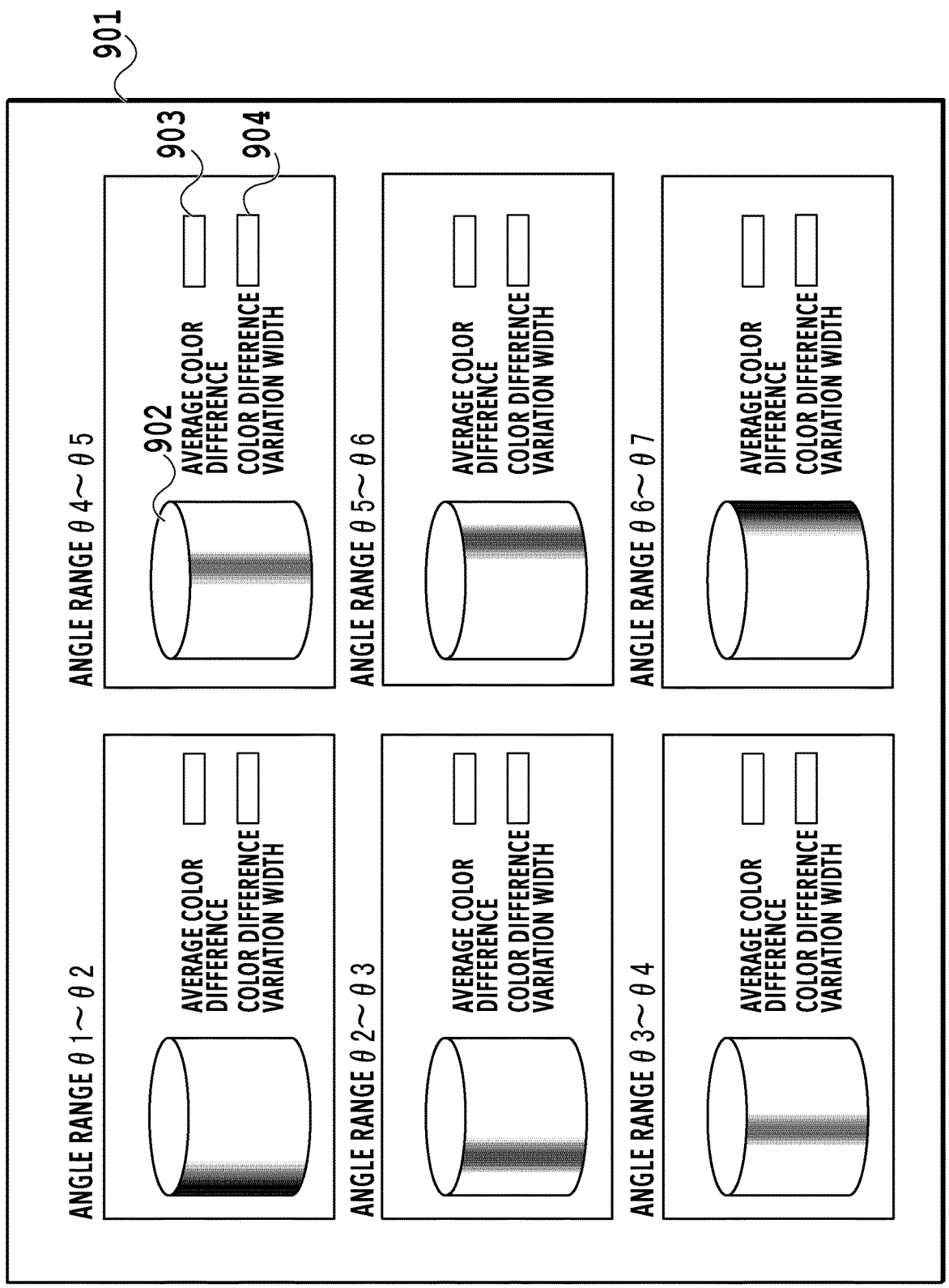
FIG. 9 is a diagram showing a UI provided by a display control unit.
Figure 10:
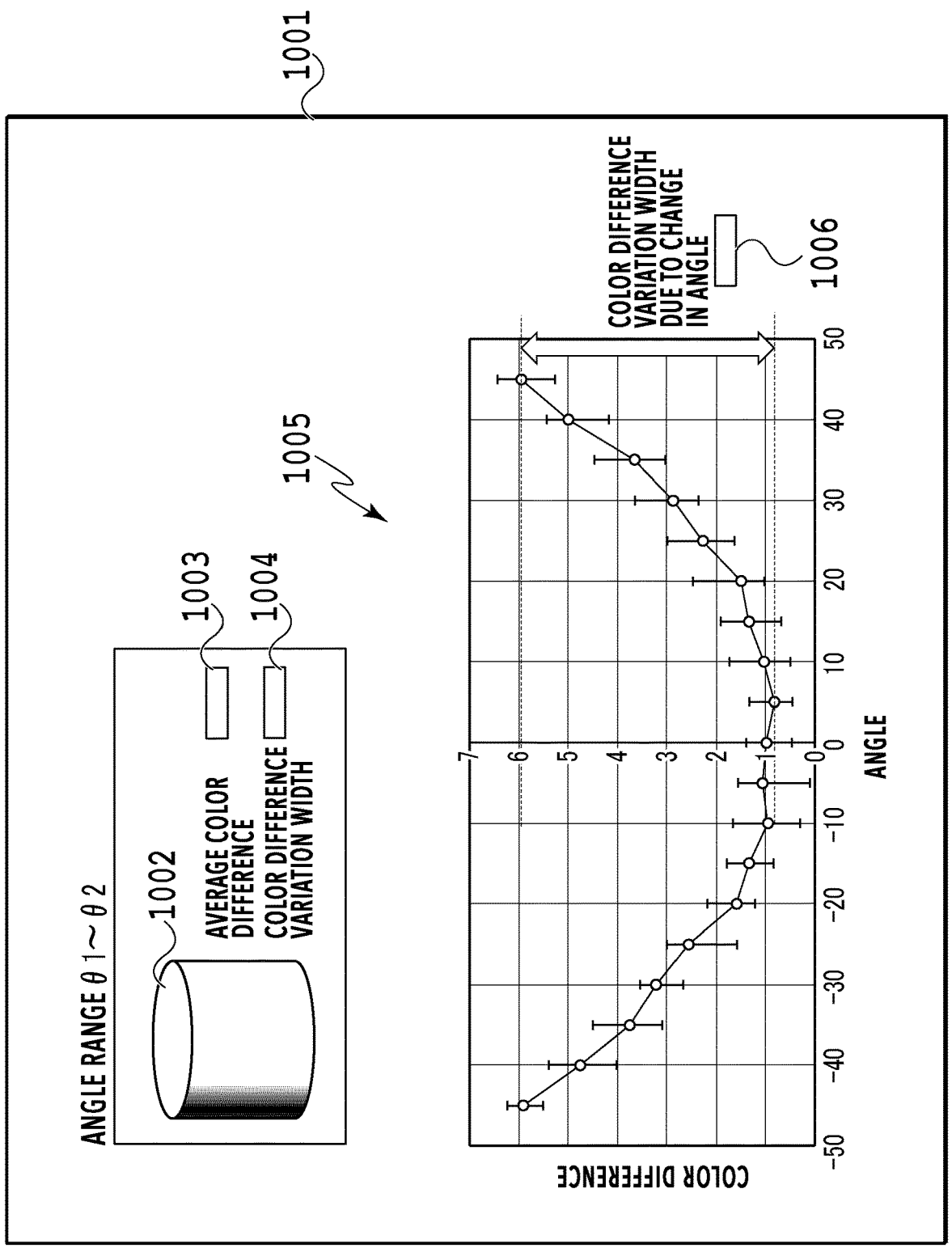
FIG. 10 is a diagram showing a UI provided by the display control unit.
Figure 11:
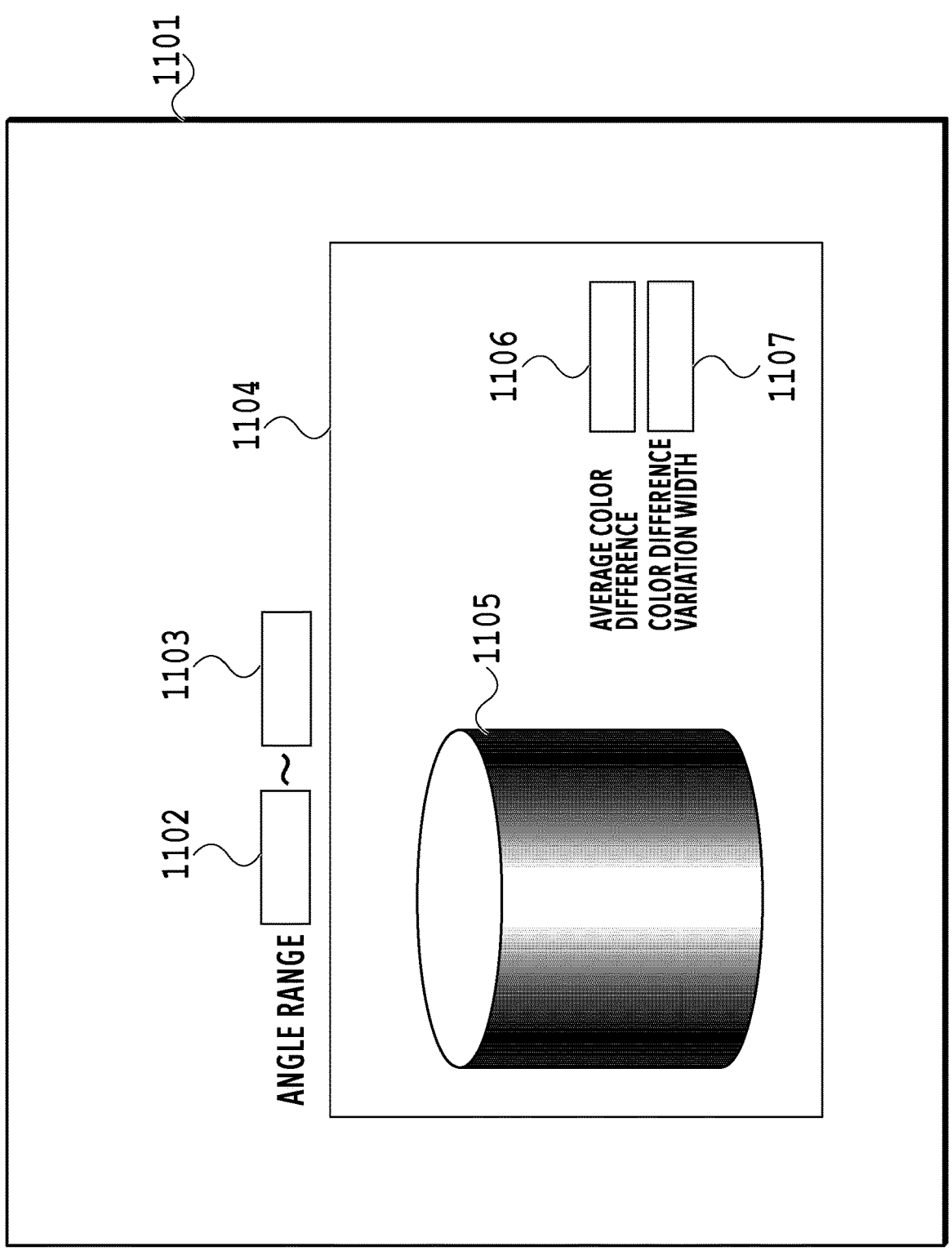
FIG. 11 is a diagram showing a UI provided by the display control unit.

An example of the UI that is displayed on the monitor 108 by the display control unit 206 at S307 is explained by using FIG. 9 to FIG. 11. FIG. 9 to FIG. 11 are each a diagram showing an example of the UI provided by the display control unit. In FIG. 9 to FIG. 11, the color difference map represents the degree (magnitude) of the color difference and in the color difference map, the color difference of white is the smallest and the color difference of black is the largest, and the gradation from white to black represents a gradual increase in the magnitude of the color difference. FIG. 9 shows a case where six ranges are set.

As shown in FIG. 9, on a UI screen 901, a color difference map 902, an average color difference 903, and a color difference variation width 904 are displayed in correspondence to each of angle ranges θ1 to θ2, θ2 to θ3, θ3 to θ4, θ4 to θ5, θ5 to θ6, and θ6 to θ7. In the average color difference 903, for example, the average color difference $\Delta E_{max, min, \theta}$ for each angle, which is the derivation results by equation 9, is displayed. In the color difference variation width 904, for example, the color difference variation width $\Delta E_{all, \theta}$ within the angle range, which is the derivation results by equation 10, is displayed. By displaying the average color difference for each angle and the color difference variation width within the angle range as described above, it is made possible to identify the color unevenness based on the average color difference for each angle and to identify a change in color due to angle based on the color difference variation width within the angle range.

Further, as shown in FIG. 10, it is also possible to display a graph 1005 of color difference derivation results and a color difference variation width 1006 due to change in angle, in addition to a color difference map 1002, an average color difference 1003, and a color difference variation width 1004, in accordance with a specific angle range on a UI screen 1001. In FIG. 10, the color difference map 1002, the average color difference 1003, and the color difference variation width 1004 show a case of the angle range θ1 to θ2. The graph 1005 is a graph created by turning the representative angle and the average color difference in each angle range into a graph in association with each other. Further, at each representative angle, the color difference variation width 1006 is shown. In a case where there is a representative angle whose color difference variation width is large compared to another representative angle, it is possible for a user to determine that the possibility is strong that the color unevenness of the coating occurs in the angle range.

As shown in FIG. 11, it is also possible to display a lower limit value 1102 and an upper limit value 1103 of an angle range, for which it is possible to set any angle, on a UI screen 1101. In this case, it is also possible to further display a color difference map 1105 corresponding to all the angle ranges and a display area 1104 in which an average color difference 1106 and a color difference variation width 1107 corresponding to a set angle range are displayed on the UI screen 1101. It is also possible to display the average color difference 1106 and the color difference variation width 1107 for any angle range as described above. Further, it is also possible to display the average color difference 1106 and the color difference variation width 1107 corresponding to the angle range in which the color difference map 1105 is set.

Figure 12:
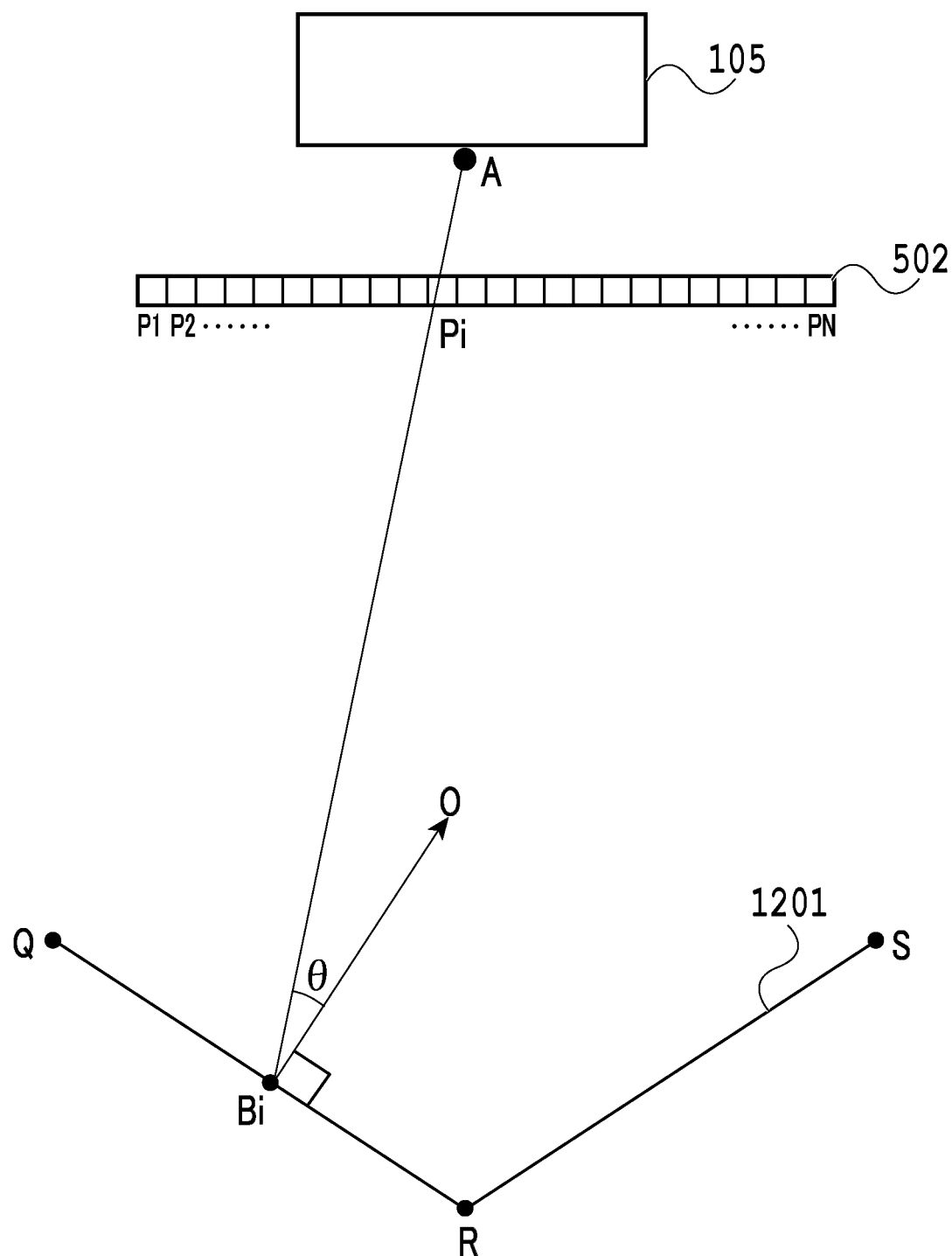
FIG. 12 is an explanatory diagram of angle information derivation processing.

Here, an example in which measurement is performed for an object other than a curved surface is explained, different from the example explained by using FIG. 5. FIG. 12 is a schematic diagram for explaining the angle information derivation processing, a schematic diagram showing the position relationship between the object and the image capturing apparatus two-dimensionally. In FIG. 12, the same symbol is attached to the same component as that in FIG. 5 and explanation thereof is omitted. In FIG. 12, symbol B indicates the center position of one of the planes of a flat plate having one inflection point, that is, an object 1201 configured by two planes. Further, in the present embodiment, it is assumed that the image capturing apparatus 105 and the object 1201 are in the state where the distance therebetween is sufficiently long.

Figure 13:
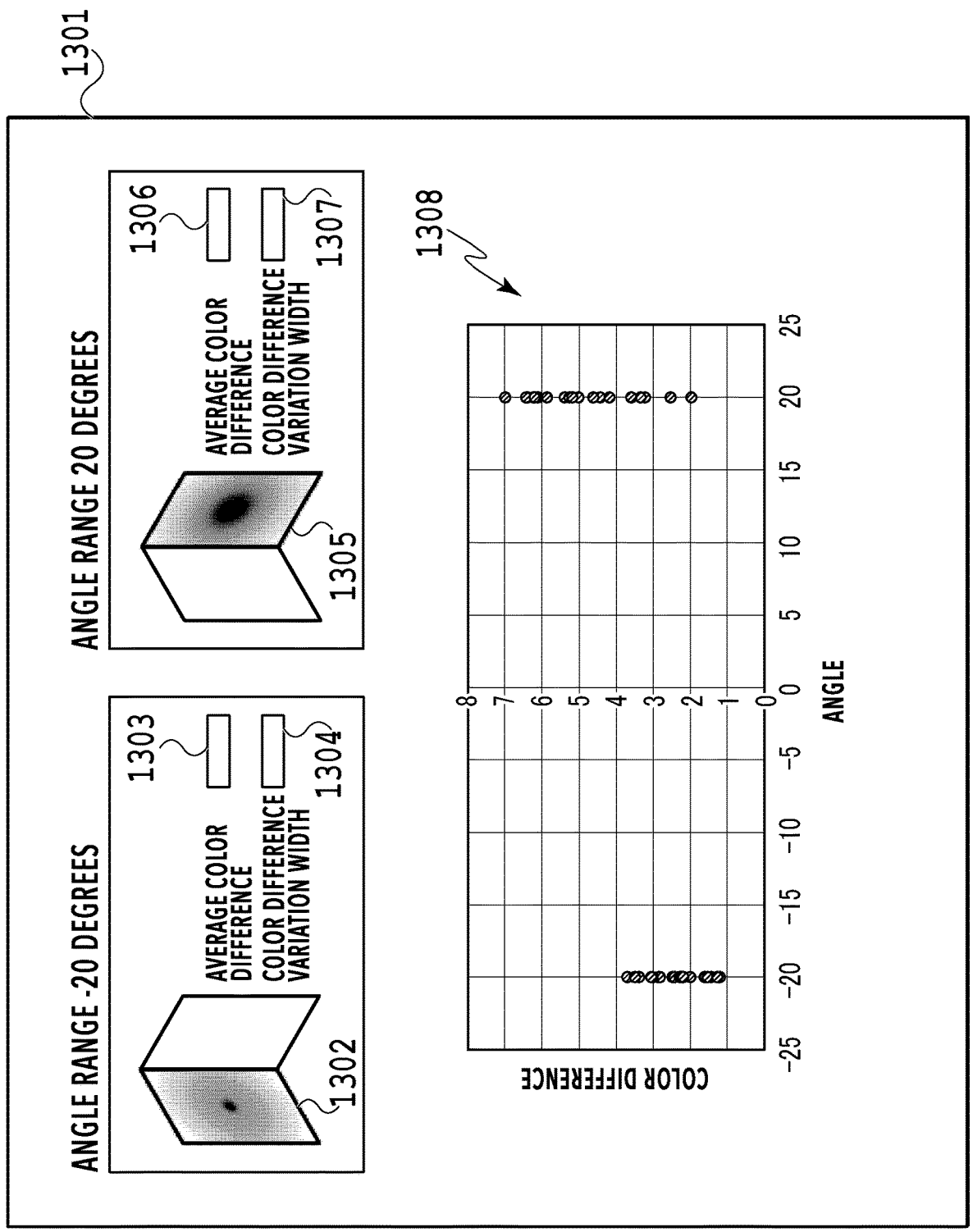
FIG. 13 is a diagram showing a UI provided by the display control unit.

In this case, an image capturing angle corresponding to each of two surfaces, that is, a surface QR and a surface RS, is obtained as the angle θ. An example of the UI provided by the display control unit 206 in this case is shown in FIG. 13. As shown in FIG. 13, it is also possible to display color difference maps 1302 and 1305, average color differences 1303 and 1306, and color difference variation widths 1304 and 1307 corresponding to each of two kinds of angle range (angle) on a UI screen 1301. Further, it is also possible to display a graph 1308 of color difference data for each angle, which is color difference derivation results, on the UI screen 1301. Even in a case of the object in which the angle changes locally as described above, by applying the present embodiment, it is made possible to analyze the color difference for a surface whose angle is constant.

As above, according to the present embodiment, based on the image capturing position information and the shape/position data, the image capturing angle for the image capturing apparatus in a local area on the surface in an object corresponding to each pixel is derived for each of the pixels in the image data. Then, based on the color difference between the color information on each pixel and the reference value, the average color difference for each predetermined image capturing angle and the color difference variation width within the image capturing angle are derived and the average color difference for each predetermined image capturing angle and the color difference variation width within the image capturing angle are displayed on the monitor 108. Due to this, it is made possible to provide information for a user to identify color unevenness based on the average color difference for each predetermined image capturing angle and to identify a change in color due to angle based on the color difference variation width within the image capturing angle.

Second Embodiment

In the first embodiment, the case is explained where the average color difference, which is a color difference within the identical angle range, and the color difference variation width, which is a color difference due to a change in angle, are displayed. In the present embodiment, an image processing apparatus is explained, which has a color difference determination unit configured to determine a color difference within a predetermined angle range and a color difference due to a change in angle based on a reference color difference, and which displays determination results on a display control unit.

(Function Configuration of Image Processing Apparatus)

Figure 14:
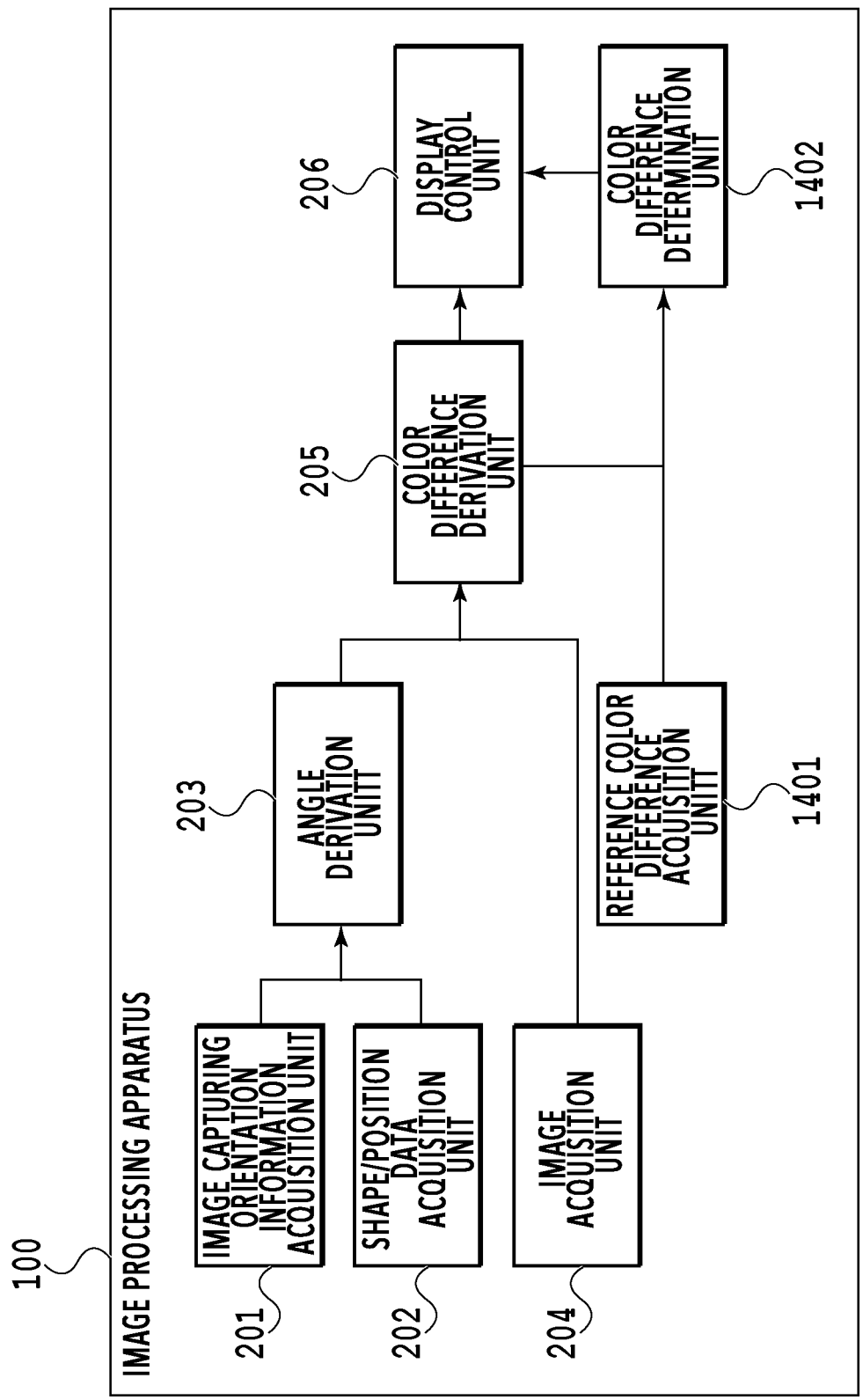
FIG. 14 is a function block diagram showing a software configuration of the image processing apparatus.

In the following, the function configuration of the image processing apparatus of the present embodiment is explained with reference to FIG. 14. FIG. 14 is a block diagram showing a function configuration example of the image processing apparatus. In the present embodiment, the same symbol is attached to the same function unit as that of the first embodiment and explanation thereof is omitted. The image processing apparatus 100 of the present embodiment further has a reference color difference acquisition unit (determination value acquisition unit) 1401 and a color difference determination unit 1402.

The reference color difference acquisition unit 1401 acquires a reference color difference, which is a determination value. The color difference determination unit 1402 compares the color difference derived by the color difference derivation unit 205 with the reference color difference acquired by the reference color difference acquisition unit 1401 and transmits comparison results to the display control unit 206.

(Main Processing Flow of Second Embodiment)

Figure 15:
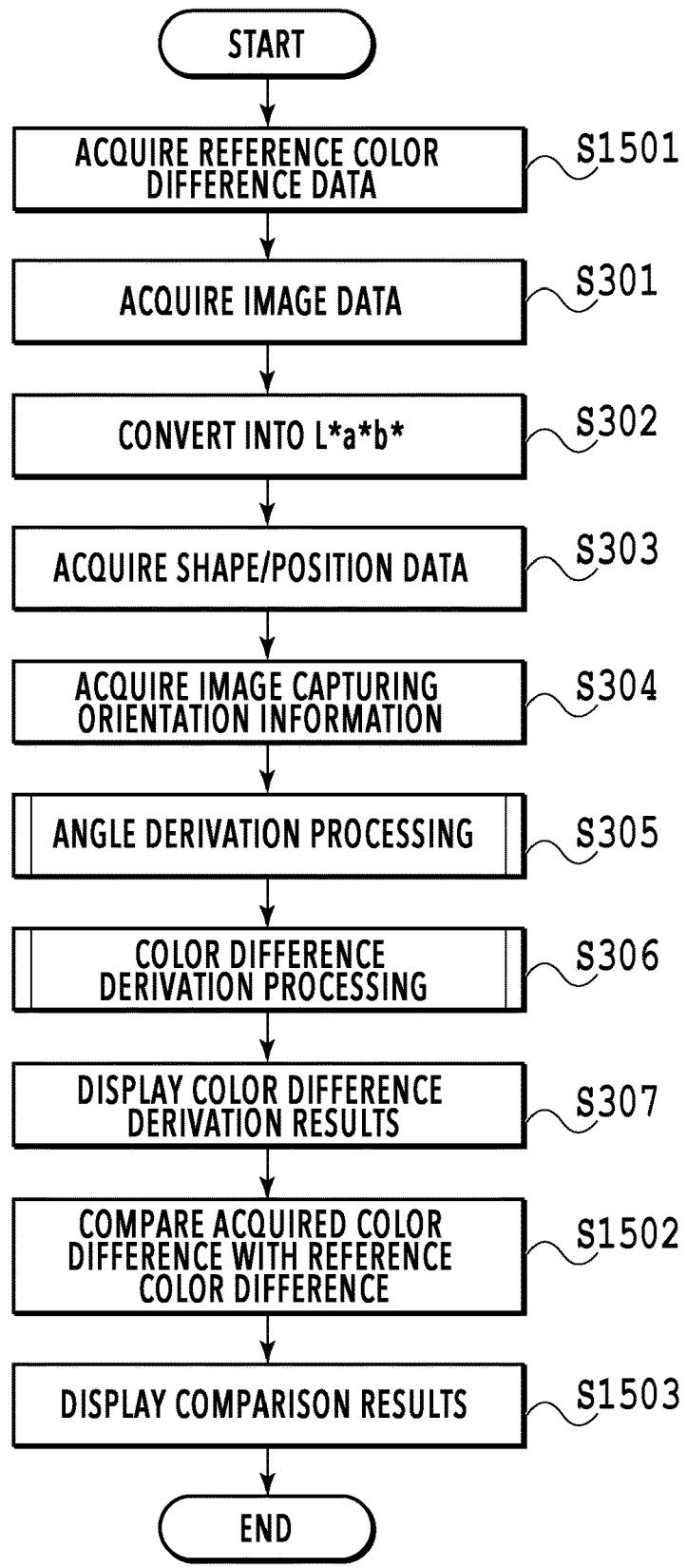
FIG. 15 is a flowchart showing a color difference information display processing procedure example.

Next, the entire flow in the present embodiment is explained with reference to FIG. 15. FIG. 15 is a flowchart showing a processing example of color difference derivation result display processing by the image processing apparatus of the second embodiment. Each symbol S in the following means that the step is a step in the flowchart. In FIG. 15, the same symbol is attached to the same step as that in FIG. 3 and explanation thereof is omitted appropriately.

First, at S1501, the reference color difference acquisition unit 1401 acquires reference color difference data, which is a reference value for determining a color difference, stored in the external memory 107 in response to user instructions being input to the input device 106. Examples of reference color differences in the present embodiment are shown in FIG. 16. FIG. 16 is a table showing an example of reference color difference data. In the present embodiment, it is assumed that the reference color difference corresponding to a within-predetermined angle (within-identical angle) and the reference color difference corresponding to a change in angle are set for each member (material) and paint as shown in FIG. 16. In the present embodiment, it is assumed that the reference color difference (determination reference) within the table is acquired by holding in advance the table in FIG. 16 in the external memory 107 and by setting the member (material) and the paint in accordance with user instructions. The reference color difference table is not limited to the reference color difference table showing a relationship between members (materials) and paints (coatings) and it is possible to design a reference color difference table showing a relationship with characteristics of an object, which may affect a within-identical angle color difference and a color difference due to a change in angle.

Here, the factor of occurrence of a color difference is explained. The color difference within a predetermined angle is affected significantly by the coating unevenness and in a case where there is coating unevenness, the color difference becomes large in accordance with the magnitude of the coating unevenness. On the other hand, the color difference due to a change in angle is the characteristics possessed originally by the paint and in a case where the object is a production part, the shape changes due to a manufacturing error and the angle of the object at the time of measurement changes, and therefore, a color difference occurs.

Next, as in the first embodiment, the processing at S301 to S307 is performed.

Next, at S1502, the color difference determination unit 1402 compares the color difference (acquired color difference) derived by the color difference derivation unit 205 at S306 with the reference color difference (determination reference) acquired at S1501. Acquired comparison results are sent to the display control unit 206.

Figure 17:
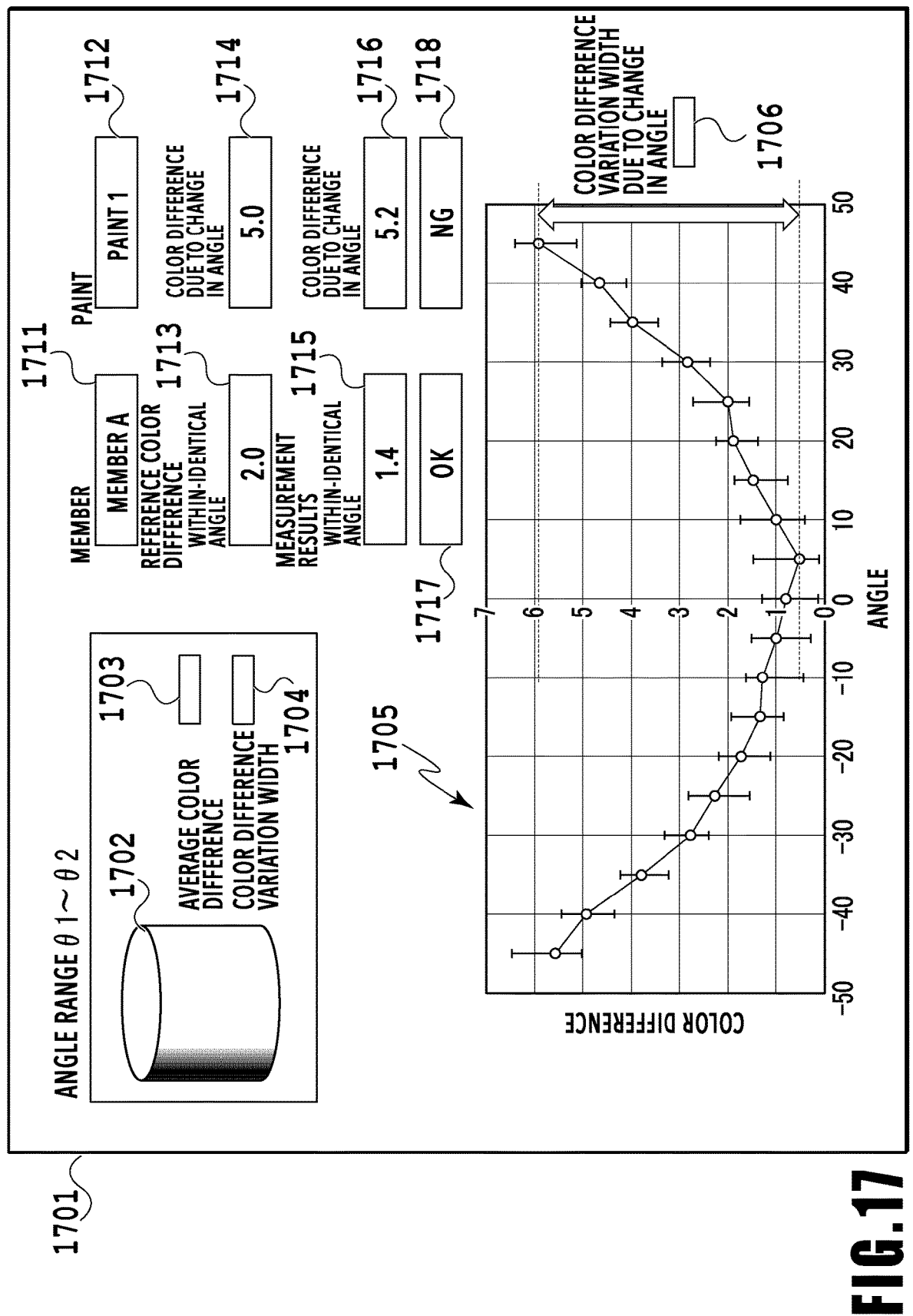
FIG. 17 is a diagram showing a UI provided by the display control unit.

Next, at S1503, the display control unit 206 displays the comparison results obtained at S1502, that is, the comparison results determined by the color difference determination unit 1402 on the monitor 108. Here, an example of the UI that the display control unit 206 displays on the monitor 108 at S1503 is explained by using FIG. 17. FIG. 17 is a diagram showing an example of a UI provided by the display control unit. As shown in FIG. 17, on a UI screen 1701, as in FIG. 10, a color map 1702, an average color difference 1703, a color difference variation width 1704, a graph 1705 of color difference derivation results, and a color difference variation width due to change in angle 1706 in accordance with a specific angle range are displayed. Further, on the UI screen 1701, a member 1711 of an object, a paint 1712 of an object, a within-identical angle regarding reference color difference 1713, and a color difference due to change in angle regarding reference color difference 1714 are displayed. Further, on the UI screen 1701, a within-identical angle regarding measurement results 1715, a color difference due to change in angle regarding measurement results 1716, and respective determination results 1717 and 1718 are displayed. In FIG. 17, in a case where it is determined that the determination reference is satisfied, OK is displayed in the determination results 1717 and 1718 and in a case where it is determined that the determination reference is not satisfied, NG is displayed in the determination results 1717 and 1718. In FIG. 17, a case is shown where for the within-identical angle, the reference color difference is 2.0 and the measurement results are 1.4, which is smaller than the reference color difference, and therefore, the determination reference is satisfied and the determination results are OK. Further, a case is shown where for the color difference due to a change in angle, the reference color difference is 5.0 and the measurement results are 5.2, which is larger than the reference color difference, and therefore, the determination reference is not satisfied and the determination results are NG The display of the determination results is not limited to this. For example, it may also be possible to indicate determination results by changing the color of the numerical value display in place of the display of OK and NG Further, it may also be possible to display OK and NG in the area of the color difference map or the graph of the measurement results. Furthermore, for the within-identical angle color difference (average color difference for each predetermined angle), it may also be possible to display that there is color unevenness in place of NG in a case where the measurement results do not satisfy the determination reference. For the color difference due to a change in angle (color difference variation width within an image capturing angle), it may also be possible to display that there is a change in color due to angle in place of NG in a case where the measurement results do not satisfy the determination reference.

The comparison results (determination results) by the color difference determination unit 1402 of the present embodiment are displayed on the monitor 108, and thereby, it is made possible for a user to check the comparison results. As a result of this, it is made possible for a user to determine as follows. That is, for example, it is made possible for a user to identify that the cause of a color difference is color unevenness, such as that the influence of the coating unevenness is exerted in a case where the determination results within the identical angle are NG Further, it is made possible for a user to identify that the cause of a color difference is a change in color due to angle, such as that the influence of the color shift due to the error of the shape is exerted in a case where the determination of the color difference due to a change in angle is NG.

As above, according to the present embodiment, the reference color difference set in advance in accordance with the member and the paint of an object is compared with the measurement results of the within-identical angle color difference and the color difference due to a change in angle, respectively, and the comparison results are displayed on the monitor 108. Because of this, it is made possible for a user to easily identify whether the cause of a color difference is color unevenness or a change in color due to angle.

OTHER EMBODIMENTS

In the first and second embodiments, although the example is explained in which the color difference is derived from color information obtained by performing color conversion processing, it is also be possible to perform processing to derive a color difference from image data having color information.

In the first and second embodiments, although the example is explained in which the image capturing orientation information is acquired after acquiring the shape/position data, it is also possible to acquire the shape/position data after acquiring the image capturing orientation information.

In the first and second embodiments, although the example is explained in which the processing is performed by inputting image data to the image processing application, a method may be accepted in which the image data captured by the image capturing apparatus is processed on the image processing hardware within the image capturing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is made possible to provide information for a user to identify a change in color due to angle and color unevenness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-091570, filed May 10, 2018, which are hereby incorporated by reference wherein in their entirety.

What is claimed is:

1. An image processing apparatus comprising:
one or more processors; and
a memory including instructions that, when executed by the one or more processors, cause the image processing apparatus to function as:
a first acquisition unit configured to acquire image capturing orientation information relating to an orientation at a time of image capturing of an image capturing unit;
a second acquisition unit configured to acquire object information relating to a shape of an object captured by the image capturing unit;
an angle derivation unit configured to derive an image capturing angle for the image capturing unit in a local area on a surface in the object based on the image capturing orientation information and the object information; and
a color difference derivation unit configured to derive a color difference from an arbitrary reference value in the object based on image data representing an image obtained by capturing the object by the image capturing unit, wherein
the color difference derivation unit derives a color difference variation width in at least one predetermined angle range of an image capturing angle for the image capturing unit in a local area on a surface in the object.

2. The image processing apparatus according to claim 1, further comprising:
a display unit configured to display the color difference variation width.

3. The image processing apparatus according to claim 2, comprising:
a color difference determination unit configured to determine whether each of an average color difference and a color difference derivation width satisfies a determination reference, wherein
the display unit displays determination results of the color difference determination unit.

4. The image processing apparatus according to claim 3, wherein
the display unit displays:
that there is color unevenness in a case where the average color difference does not satisfy the determination reference; and
that there is a change in color due to angle in a case where the color difference variation width does not satisfy the determination reference.

5. The image processing apparatus according to claim 3, wherein
the determination reference is set in accordance with a material and a coating of the object.

6. The image processing apparatus according to claim 2, wherein
the display unit displays results derived by the color difference derivation unit as a graph.

7. The image processing apparatus according to claim 2, wherein
the display unit displays a color difference for each pixel in the object.

8. The image processing apparatus according to claim 2, wherein
the color difference derivation unit derives an average color difference in the at least one predetermined angle range and
the display unit displays the average color difference.

9. The image processing apparatus according to claim 8, wherein
the average color difference is derived from a maximum value of the color difference and a minimum value of the color difference in the predetermined angle range.

10. The image processing apparatus according to claim 8, wherein
the display unit displays an average color difference of each of the predetermined angle ranges in association with a representative angle of each angle range.

11. The image processing apparatus according to claim 1, wherein
for each pixel in image data representing an image obtained by capturing the object by the image capturing unit, an image capturing angle for the image capturing unit in a local area on a surface in the object, corresponding to each of the pixels, is derived and
the color difference derivation unit derives an average color difference and a color difference variation width for each of a plurality of angle ranges.

12. The image processing apparatus according to claim 1, wherein
the image capturing orientation information includes information indicating an image capturing position of the image capturing unit and information indicating an image capturing direction at the time of image capturing of the image capturing unit.

13. The image processing apparatus according to claim 1, wherein
the image capturing angle is an angle formed by a segment between a local area of the object and a viewpoint of the image capturing unit and a normal corresponding to a local area of the object.

14. The image processing apparatus according to claim 1, wherein
the color difference is derived based on an average value of color information and the reference value and the color difference variation width is derived from a maximum value of the color difference and a minimum value of the color difference in the predetermined image capturing angle range.

15. The image processing apparatus according to claim 1, wherein
the color difference derivation unit derives the color difference variation width corresponding to a received setting from a user.

16. The image processing apparatus according to claim 1, wherein
the predetermined angle range is a value that is regarded as being an identical angle.

17. The image processing apparatus according to claim 1, wherein
the color difference derivation unit derives a color difference for each pixel in the image data.

18. The image processing apparatus according to claim 1, wherein
the color difference derivation unit derives a color difference by using $L^*$, $a^*$, and $b^*$.

19. An image processing method comprising:
acquiring image capturing orientation information relating to an orientation at a time of image capturing of an image capturing unit;
acquiring object information relating to a shape of an object captured by the image capturing unit;

deriving an image capturing angle for the image capturing unit in a local area on a surface in the object based on the image capturing orientation information and the object information; and deriving a color difference from an arbitrary reference value in the object based on image data representing an image obtained by the image capturing unit capturing the object, wherein in the deriving a color difference, a color difference variation width in at least one predetermined angle range of an image capturing angle for the image capturing unit in a local area on a surface in the object is derived.

20. A non-transitory computer readable storage medium storing a program for causing a computer to perform an image processing method, the method comprising:

acquiring image capturing orientation information relating to an orientation at a time of image capturing of an image capturing unit;

acquiring object information relating to a shape of an object captured by the image capturing unit;

deriving an image capturing angle for the image capturing unit in a local area on a surface in the object based on the image capturing orientation information and the object information; and deriving a color difference from an arbitrary reference value in the object based on image data representing an image obtained by the image capturing unit capturing the object, wherein in the deriving a color difference, a color difference variation width in at least one predetermined angle range of an image capturing angle for the image capturing unit in a local area on a surface in the object is derived.

* * * * *